Figures 1, 2:
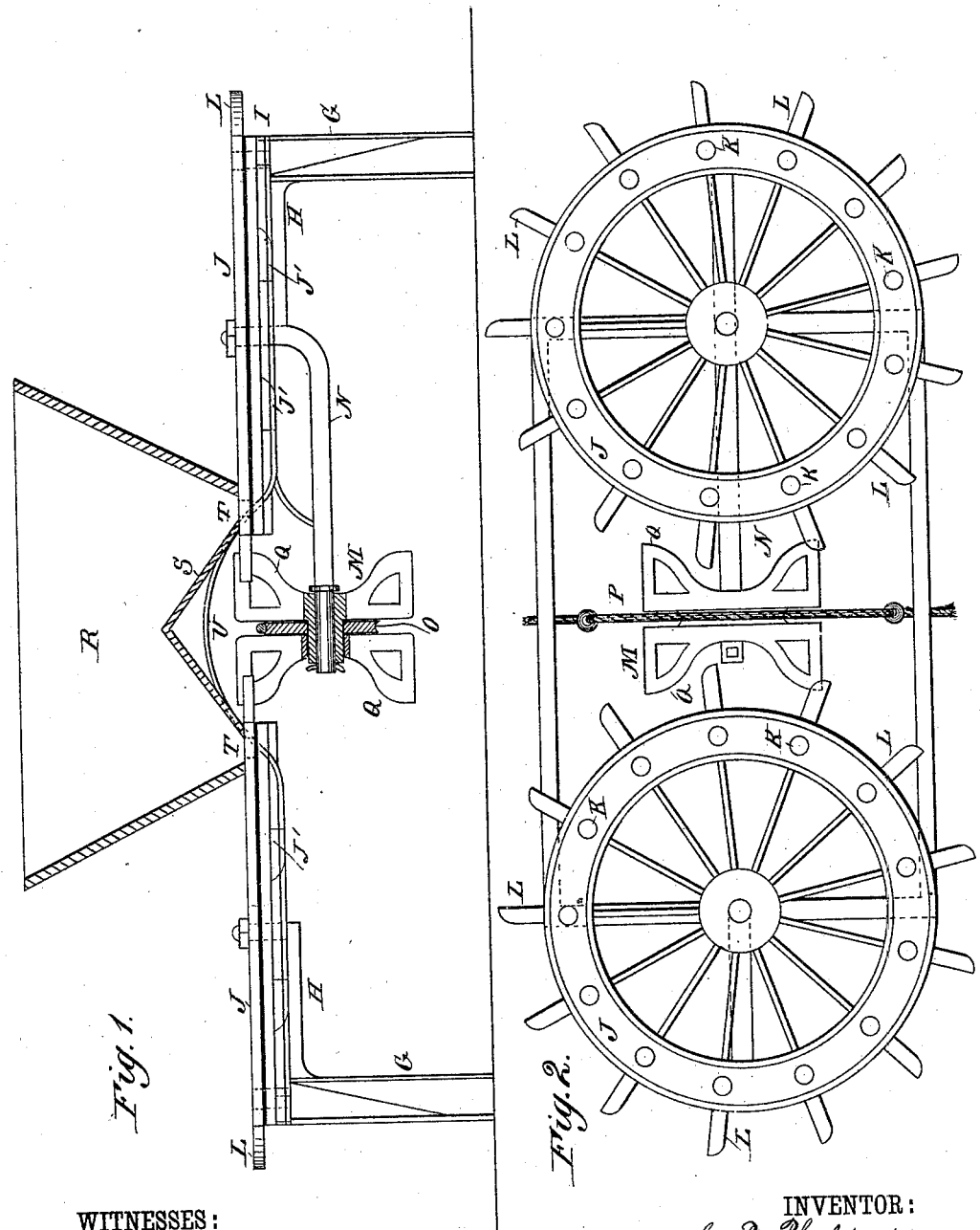

(No Model.) 2 Sheets—Sheet 1.

C. P. PHELPS.
CORN PLANTER.

No. 283,812. Patented Aug. 28, 1883.

WITNESSES:
W. W. Hollingsworth
A. G. Lyne

INVENTOR:
C. P. Phelps
BY
ATTORNEYS.

(No Model.) 2 Sheets—Sheet 2.
C. P. PHELPS.
CORN PLANTER.
No. 283,812. Patented Aug. 28, 1883.
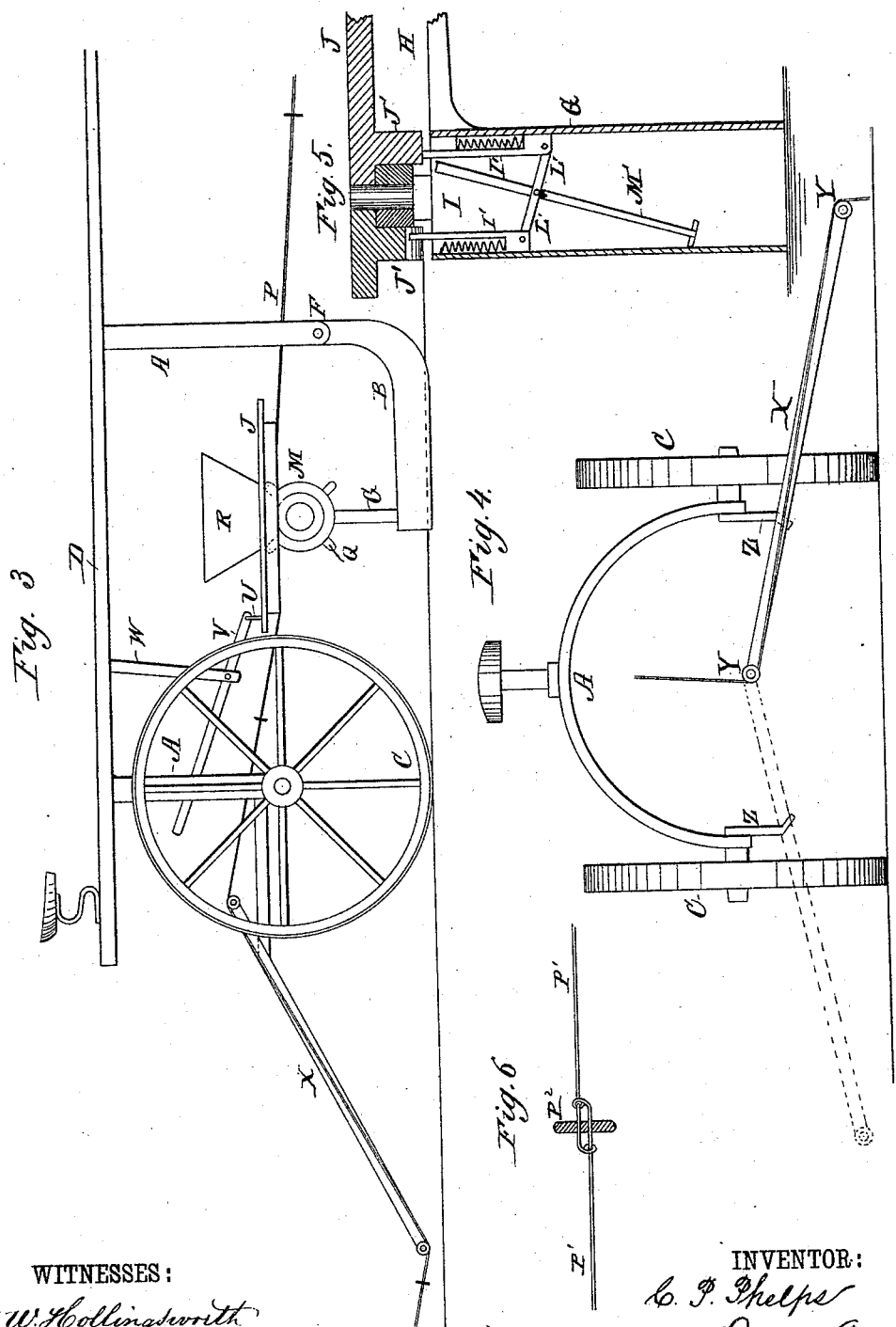
WITNESSES:
W. W. Hollingsworth
A. G. Syne
INVENTOR:
C. P. Phelps
BY
ATTORNEYS.

UNITED STATES PATENT OFFICE.

CHARLES PORTER PHELPS, OF PRINCETON, ILLINOIS.

CORN-PLANTER.

SPECIFICATION forming part of Letters Patent No. 283,812, dated August 28, 1883.

Application filed October 14, 1882. (No model.)

*To all whom it may concern:*

Be it known that I, CHARLES PORTER PHELPS, of Princeton, in the county of Bureau and State of Illinois, have invented a new and useful Improvement in Corn-Planters, of which the following is a full, clear, and exact description, reference being had to the annexed drawings, forming part of this specification, in which—

Figure 1 is an elevation of the hopper, seed-wheels, cam, and supporting-uprights of my improved planter, the same being partly in section. Fig. 2 is a plan of the same with the hopper removed. Fig. 3 is a side elevation of the planter Fig. 4 is a rear view of part of the same. Fig. 5 is a sectional detail, and Fig. 6 shows the manner of attaching the disks to the wire.

A indicates two curved bars, one arranged in front of the other, and connecting, respectively, the runners B and the covering-wheels C to the tongue-beam D. The forward bar A is flexibly jointed to the runners at F, and the hindmost bar A serves as a stationary axle for the covering-wheels. To the rear ends of the runners are attached hollow standards G, which, together with the knee-bars H, secured to the standards, serve as a support for the annular base-plates I, upon which the seed-wheels J are adapted to rotate. The seed-wheels J are provided with cups K, set in recesses in the upper face of their rim, which cups are to be made removable in order that cups of different capacities may be interchangeably used to suit the size and quantity of grain to be planted, and the two wheels J, which are provided with radial projections L, corresponding to the seed-cups, are arranged at opposite sides of the planter, with a sufficient interval between them to accommodate an agitating wheel or cam, M, which is adapted to strike the projections on the seed-wheels to communicate a rotary movement thereto. The base-plates I are provided with openings communicating with the hollow standards G, through which the grain drops when the cups successively pass over said openings.

The agitating-wheel M is supported upon a shaft, N, attached to the knee-bar H, and is formed with a central sheave, O, in which the propelling wire or rope P is placed, and the wire is provided with balls or disks arranged thereon at regular intervals, which, as the planter moves forward across the field, strike the sides of the agitator and cause it to rotate sufficiently to move the seed-wheels in the required manner—that is to say, with an intermittent movement—by which the cups shall be brought successively at regular intervals to the discharge-orifices in the base-plates. The agitating-wheel is formed with laterally-inclined projections Q, which are adapted to move the seed-wheels. Each seed-wheel is provided with two flanges of annular form, projecting downward at right angles to their lower surface in such manner that they shall overlap the rigid base-plates I, as shown in Fig. 5. The lower edges of these annular flanges are provided with a series of projections, J', with which engage arms I', spring-tensioned, and flexibly connected to shoulders L', on opposite sides of the pivoted stop-drop M', which shoulders are located in the hollow standards G, and the movement of the seed-wheels, with their flanges passing over said arms, imparts to the stop-drop the desired lateral motion. The seeds are caught by the stop-drop and held near the furrow until the stop-drop is operated.

The hopper R is provided with a raised V-shaped bottom, S, and openings at T on opposite sides, just above the paths of the two sets of cups, while the seed-wheels are so arranged with respect to the hopper that a close joint shall be formed between them to prevent the escape of seed otherwise than through the cups. At the rear of the hopper is a transverse curved bar, U, secured to the frame which supports the seed-wheels, to which bar U is flexibly connected a foot-lever, V, fulcrumed at the end of a rod, W, depending from the tongue-beam. By depressing the foot-lever the runners will be lifted out of the ground.

At the rear of the planter is a reversible guide-bar, X, having sheaves Y at the ends, over which the rope or wire, which is stretched across the field, is allowed to pass as the planter moves forward. This bar is to be jointed to a suitable support, and may be turned over from one side to the other, where it is supported on rests Z, or other suitable devices.

It is evident that by using a straight axle and securing a pulley thereto the agitating-wheel M may be operated by a belt or chain connected to said pulley, where the wire or rope is not used.

It is common to use a rope or wire having knots or projections thereon at regular intervals, and which is stretched across a field, as a means of imparting motion to the dropping device of a planter. In constructing such a wire, however, I cut the wire in pieces or sections P', corresponding in length with the distance desired between the projections, and provide balls or disks P², having two parallel perforations. The adjacent ends of two sections of the wire are then passed through the perforations in opposite directions, and the end of one section is wrapped around the other section, so that when the sections are drawn in opposite directions the balls will be clamped and firmly held between two knots. This construction is shown in Fig. 6. As this construction is not claimed in the present application, it will be made the subject-matter of a subsequent application for patent.

The agitating-wheel M is preferably formed in two parts, one having a hub which serves as the axle of the sheave O, and to the end of which the other part of said wheel is secured.

Having thus described my invention, what I claim, and desire to secure by Letters Patent, is—

1. The combination, with the seed-wheels having cups in their rims, and arranged in a horizontal position at a slight distance apart, of the agitating wheel or cam arranged between them and having laterally-inclined projections Q, adapted to engage with peripheral projections on the wheels, substantially as shown and described, whereby the wheels may be operated by a single wire or rope.

2. The corn-planter having a rigid frame supported upon wheels and provided with pendants at the forward end, and in combination therewith the runners, which are pivoted to the lower ends of the pendants, and a lever supported from the frame, whereby the runners may be raised or lowered independent of the movement of the frame, substantially as specified.

3. The combination of the wire having balls or projections secured thereto at intervals and stretched across a field, the reversible guide-bar having sheaves for the wire and jointed to a supporting-frame at the rear of the planter, the agitating-wheel having a central sheave for the wire, the seed-wheels constructed and arranged as described, and the hopper having a raised V-shaped bottom and openings at the sides of the bottom for discharging seed into the cups of the two wheels, substantially as shown and described.

4. The combination of the agitating-wheel, the seed-wheels having parallel annular rims or flanges provided with projections, the annular base-plates supported between said flanges, the hollow uprights connected to the base-plates, respectively, the pivoted stop-drop, and one or more arms pivoted to shoulders on corresponding sides of the stop-drop and adapted to be depressed by the projections on the flanges of the seed-wheels to oscillate the stop-drop, substantially as shown and described.

5. The combination of the hollow uprights, the annular base-plates having openings leading thereto, the seed-wheels having perforations or cups registering in turn with the openings in the base-plates when the said wheels are rotated, the hopper centrally located, and adapted to supply the cups of both wheels with seed, and the cam adapted to give a suitable movement to the seed-wheels to discharge the seed as required, substantially as shown and described.

CHARLES PORTER PHELPS.

Witnesses:
CHARLES B. CAUFFMAN,
JAMES WILSON THOMPSON.